Patented Apr. 21, 1942

2,280,650

UNITED STATES PATENT OFFICE 2,280,650

MANUFACTURE OF CATALYSTS

Louis S. Kassel, Chicago, Ill., assignor to Universal Oil Products Company, Chicago, Ill., a corporation of Delaware No Drawing. Application June 28, 1940,
Serial No. 342,901

10 Claims. (Cl. 252—254)

This invention relates to the manufacture of catalysts suitable for accelerating reactions among hydrocarbons to produce large yields of high antiknock gasoline.

More specifically, it has reference to a method of manufacturing extruded refractory catalytic materials which are particularly effective in selectively promoting the formation of said high antiknock motor fuel in the cracking of relatively heavy petroleum fractions. The catalysts are also applicable to conversion of single hydrocarbons, synthetically produced hydrocarbon mixtures or primary distillates produced in the destructive distillation of hydrocarbon-containing materials such as coals, lignites and shales. The preferred catalysts are prepared synthetically by definite procedures which are specific in the production of catalysts of high activity for prolonged use under high temperature conditions of processing and regeneration.

A large number of hydrated oxides have been composited or compounded with silica gel according to various procedures whereby composites are formed which are utilized as catalysts in numerous reactions such as hydrogenation, oxidation and other types as well as in the hydrocarbon cracking reactions. These composites include various oxides of aluminum, chromium, cobalt, manganese, nickel, copper, thorium, molybdenum, titanium, vanadium, zirconium and others. Although the methods of the present invention are applicable to the formation of formed particles from composites of the above hydrous oxides with hydrated silica, the invention is particularly directed to the formation of composites of precipitated hydrated silica with such hydrous oxides as alumina and/or zirconia which composites are especially active in catalyzing hydrocarbon conversion reactions.

In one specific embodiment the present invention comprises an improvement in the manufacture of catalysts suitable for use in hydrocarbon conversion reactions to produce substantial yields of gasoline having high antiknock value whereby particles of the cracking catalyst are formed by extruding an intimate mixture of the catalytic material, a major proportion of which is in the finely divided or powdery condition and a minor proportion is in the gel condition.

According to the process of the present invention, a mixture of hydrous oxides suitable for extrusion is prepared by intimately associating a part of the preparation in the finely divided or powdery condition and part in the gel condition. This procedure has several advantages over the usual procedure of extruding only the gel. The finely divided material is simpler to prepare, and easier to wash and purify than the corresponding gel material. The water content can be regulated in the mixture of finely divided material and gel more readily than in the gel alone so as to obtain a firm product while sufficient moisture is present to properly lubricate the dies. The extruded material after drying and heating has greater crushing strength and develops fewer cracks or fissures than corresponding product from gels alone.

The finely divided precipitated material and the gel may be of essentially the same composition varying only in the physical structure and water content, or they may be of different composition. Hydrated silica may be prepared in a finely divided condition where the individual particles are very small and approach colloidal dimensions. This finely divided precipitate may then be purified, or it may have composited therewith other hydrous oxides before it is washed and purified. The hydrous oxides for example may be precipitated in the presence of the finely divided hydrated silica and the composite washed, either before or after partial drying with relative ease as compared with the washing of corresponding materials in the gel state. The gel which is intimately admixed with finely divided precipitate may be either a silica hydrogel or a hydrogel of a hydrous oxide such as alumina and/or zirconia, or a composite of these hydrogels may be used which partakes in the desired catalytic effects of the catalyst preparation.

In the preparation of finely divided silica, a commercial grade of water glass, for example, may be diluted approximately ten times with an aqueous solution of a salt of an alkali metal such as sodium chloride wherein the amount of salt used may be approximately one-half that of the water glass. An acid such as hydrochloric acid may then be added, while agitating, in sufficient proportions to precipitate the finely divided or powdery hydrated silica. In the precipitation of the hydrated silica, a precipitate of sodium silicate may form at first which is then converted to hydrated silica. Finely divided silica in the desired form remains in suspension for a relatively long time without any appreciable tendency of settling out. This finely divided hydrated silica may be washed and purified, subsequently mixed with the gel component and then extruded, or the suspension of the finely divided precipitate may be mixed with a salt of a metal of which a hydrated oxide is to be precipitated in the presence of the finely divided hydrated silica. A volatile alkaline reagent such as ammonium hydroxide may then be added to precipitate the hydrated oxide. According to another general procedure, a solution of sodium silicate may be mixed with a solution of a metal salt whose hydrous oxide is to be co-precipitated with a hydrated silica in the presence of added substance causing fine precipitation, and the acidity or alkalinity adjusted by the addition of acid or alkaline reagent. In this case also very finely divided precipitate is formed as a suspension distributed through the liquid when the substances added to bring about precipitation in finely divided form and the reactants are present under proper pH conditions and concentration.

Although silica hydrogel or alumina hydrogel for example may be employed as the gel component of the extrusion mixtures, various gels may be composited and used, and numerous methods may be employed in compositing the gels. The components may be separately, concurrently or consecutively precipitated. Generally speaking, the primary and major component of the gel as well as of the final composited catalyst, is a precipitated hydrated silica which is usually admixed with a precipitated hydrous metal oxide such as alumina, zirconia or mixtures thereof and present in minor proportions. According to one general method of preparation, the hydrated silica may be precipitated from a dilute solution of commercial water-glass and subsequently admixed with the remaining hydrous oxide components with or without preliminary purification. The hydrated silica may be admixed with the hydrous oxide components in any suitable manner. Similarly as for the finely divided precipitate, the precipitated hydrated silica may be suspended in a solution of a metal salt and a hydrous oxide precipitated in the presence of the suspended hydrated silica by the addition of a suitable alkaline precipitant. Various other procedures may be followed, however, wherein these components may be co-precipitated or separately precipitated, and the hydrated oxide components intimately admixed. The hydrated silica gel may for example be immersed in solutions of the metal salts and hydrous oxides deposited upon the hydrated silica gel by means of hydrolytic adsorption.

As has been indicated, the finely divided and the gel components are each usually washed and purified. In order to produce refractory and stable catalysts for prolonged use it has been found necessary where alkali metal impurities such as sodium compounds have been incorporated into the catalytic material during preparation to treat it at some stage of its preparation to remove these alkali metal impurities. The finely divided and the gel components may thus each consist of hydrated silica with or without added hydrated oxides. Each of these may be purified before or after adding hydrated oxides and in the case of the finely divided part, it may be treated before or after partial drying. The purification may be accomplished by washing with water containing small amounts of acid or salts such as mineral acid salts of the metal component of the added metal oxides. Thus hydrated silica may, for example, be washed with water containing small amounts of hydrochloric acid or aluminum chloride, or finely divided hydrated silica may be partially dried and then washed in this manner, or hydrated silica with added hydrated oxides may sometimes be similarly washed. The washing is more difficult in the case of the gels than in the case of the finely divided material, larger volumes of wash liquid are required, and more handling and/or equipment is necessary. In the washing of the gel or the finely divided precipitate, they may be directed as an aqueous suspension to a convenient form of filter such as a centrifugal filter or filter press for example wherein the large bulk of the liquid is removed and a filter cake is obtained. Since this filter cake, particularly in the case of the gels, is rather difficult to wash in situ, one practice consists of re-slurrying the filter cake in the washing agent and returning to the filter, repeating this process if necessary until the material is suitably washed. In the case of the finely divided material it may be partially dried and the partially dried materials washed free from the undesired impurities by various methods.

The finely divided hydrated materials and the hydrogel which are substantially free from alkali metal impurities are intimately mixed in the desired proportions prior to extrusion by any suitable means. The invention is not restricted to a simple mixing procedure however since it is possible to prepare the finely divided portion as has been described above and precipitate the hydrogel in an aqueous suspension of the finely divided component. The final composite may then consist of mixtures of hydrated silica with other hydrous oxides such as those of aluminum, zirconium, vanadium, thorium, chromium, or of other metals which yield materials having catalytic and adsorbent properties. Various proportions of the hydrated oxides may be present in the finished product, the more frequent practice being to have minor amounts of added hydrated oxides and major proportions of hydrated silicon dioxide. Thus, in the preparation of highly porous silica-alumina catalysts, 5 to 30% of hydrated alumina is distributed and very intimately disposed in and on the surface of 95 to 70% of hydrated silicon dioxide. Smaller and larger proportions of alumina and/or zirconia, or other hydrous oxides may also be similarly used but not with equivalent catalytic effects.

The mixtures may be extruded in conventional extruding equipment under high pressure and the extruded material is usually cut into short cylinders which are subsequently handled so as not to lose the identity of the individual particles whereupon they are carefully dried and then calcined at approximately 1000 to 1600° F. The average size of the extruded particles may vary within the approximate range of 4–10 mesh, more or less, which is not restricted necessarily to short cylindrical shapes since the shape of the product may be modified for example as to approach a spherical condition.

The catalysts of the present invention may be conveniently utilized in carrying out various types of hydrocarbon conversion reactions when employed as filling material in tubes or may be disposed in trays or in chambers. A hydrocarbon oil fraction is usually heated to substantially reaction temperature and the vapors contacted with the stationary catalyst masses. The hydrocarbon vapors may be passed downward through the catalyst, and where large beds of catalyst are involved the passage of vapors may be restricted to definite paths rather than allowing the vapors to have unrestricted contact with the large beds of catalytic material. Where this method is used, the temperature of the contact materials while in use and during regeneration may be controlled by various operating procedures or by heat interchange devices. After the oil vapors have passed over the catalyst as in catalytic cracking for example, the products may be separated into high boiling fractions unsuitable for further cracking and/or insufficiently converted fractions which may be subjected to further cracking treatment and the gasoline and gaseous products. The higher boiling fractions may be removed from the system, may be returned directly to admixture with the charging stock or may be processed in separate passes so as to ultimately obtain maximum utilization of the charging stock in producing the gasoline product.

The following specific examples are given to illustrate applications of the process of the invention, the activity of the catalyst preparation also being indicated. The invention should not be considered as limited to these examples of the process of manufacture or to these particular catalyst preparations since they are given as illustrative of the novelty and utility of the invention.

Example I

A silica-alumina catalyst having approximately the following composition, $100SiO_2.10Al_2O_3$, may be prepared according to the following procedure. In this preparation approximately 65% consists of finely divided precipitated hydrated silica and 35% of silica-alumina hydrogel. Two parts by weight of commercial water glass containing 8 to 9% $Na_2O$ and approximately 28% $SiO_2$ is diluted approximately 10 times by adding to a salt solution containing approximately one part by weight of sodium chloride in solution. Relatively concentrated hydrochloric acid is gradually added to the diluted sodium silicate-sodium chloride solution while agitating and a suspension of very finely divided hydrated silica is formed. The gradual addition of acid is continued while the liquid still remains slightly alkaline. An excess of acid is then added and the excess acid substantially neutralized with ammonium hydroxide. The silica suspension is filtered on a centrifugal filter and then washed with acidulated water to remove alkali metal impurities. The washed precipitate is dried at approximately 225° F. and the dried material consists of a fluffy powder of very fine texture.

A silica hydrogel is separately prepared according to the same procedure with the omission of the sodium chloride. The silica hydrogel is also washed to remove alkali metal impurities but is not dried. The purified silica hydrogel is suspended in a solution of aluminum chloride, the aluminum chloride being present in sufficient proportions to yield hydrated alumina in the amount indicated above with relation to the hydrated silica components. The hydrated alumina is precipitated by the addition of ammonium hydroxide and the hydrated silica-alumina gel is filtered and thoroughly kneaded with the dried powder under pressure and the kneaded mixture extruded under high pressure. The extruded material is cut into short cylinders and these are dried at a temperature of approximately 200° F. and the dried particles then calcined at a temperature of 1500° F. for approximately two hours.

Catalyst particles of this type when disposed in a reaction chamber and contacted at an hourly space velocity of 2 with Pennsylvania gas oil vapors preheated to a temperature of approximately 940° F. at approximately 40 pounds per square inch will yield 42% by volume of gasoline with an octane number of 80 by the motor method. The catalyst is used in a cycle operation wherein the catalyst is alternately processed in contact with hydrocarbons and regenerated in presence of oxygen-containing gases. The catalyst is relatively stable in activity and may be used for a long time without substantial loss due to disintegration of the particles.

Example II

A silica-alumina-zirconia may be prepared as follows having approximately the formula $100SiO_2.2Al_2O_3.5ZrO_2$ and may consist of 70% of finely divided precipitated hydrated silica and hydrated alumina while 30% may consist of a silica-zirconia hydrogel. A finely divided precipitated hydrated silica is prepared as described in Example I and is suspended in a solution of aluminum chloride in an amount which yields precipitated alumina in the proportion above indicated. The hydrated alumina is precipitated by the addition of ammonium hydroxide and the silica-alumina composite thus found is then filtered on a centrifugal filter and dried at approximately 200° F. The dried material is washed with acidulated water to substantially remove alkali metal impurities. The washed material is substantially dried and mixed with the gel component prepared as hereinafter described.

A silica hydrogel is separately prepared similarly as the hydrated silica above described with the exception that the sodium chloride is omitted and a gel therefore formed. The silica hydrogel is filtered to remove the bulk of the impurities present in the reactant liquors and the filtered hydrated silica is then suspended in a solution of zirconyl chloride in an amount which will yield zirconia in the proportions indicated above, and hydrated zirconia precipitated by the addition of ammonium hydroxide. The silica-zirconia hydrogel is then filtered and washed with water acidulated with hydrochloric acid to substantially remove alkali metal impurities. The gel is then thoroughly kneaded with the dried powder, and the kneaded mixture extruded under high pressure. The extruded material is then cut into short cylinders, dried and calcined similarly as for the preparation described in Example I.

Example III

A silica-alumina-zirconia catalyst having the following approximate composition,

$$100SiO_2:5Al_2O_3:10ZrO_2$$

may be prepared according to the following procedure. Two parts of commercial water glass containing approximately 28% $SiO_2$ and 8 to 9% $Na_2O$ is diluted approximately 10 times by the addition of a salt solution containing approximately one part by weight of sodium chloride in solution. Concentrated hydrochloric acid which is diluted with an equal amount of water is gradually added to the mixture of diluted sodium silicate-sodium chloride solution while thoroughly agitating. Acid is gradually added and a finely divided hydrated silica is precipitated out while the solution is still in a slightly alkaline condition. Excess acid is then added and the excess substantially neutralized with ammonium hydroxide. The suspension is then pumped into a tank which contains zirconyl chloride in solution in an amount which will yield zirconia in the proportion above indicated, and the solutions are thoroughly mixed. The zirconia is then precipitated by the addition of ammonium hydroxide whereupon the suspension is directed to a centrifugal filter where the filter cake is water washed, removed and then dried at approximately 225° F. The dried material is washed with water acidulated with hydrochloric acid until alkali metal impurities are substantially removed as indicated by the magnesium uranyl acetate test. The purified silica-zirconia composite is then suspended in a solution of aluminum chloride in sufficient amount to yield alumina in the proportion above indicated. Alumina hydrogel is then precipitated in the presence of the suspended silica-zirconia composite by the gradual addition of ammonium hydroxide. This material then consists of finely divided particles of silica-zirconia which has been embedded in alumina hydrogel and this mixture is in suitable form for extruding under high pressure according to the present process and is subsequently dried and calcined similarly as for the preparation in Example I.

I claim as my invention:

1. A process for the manufacture of catalytic material suitable for use in hydrocarbon conversion reactions which comprises preparing a major proportion of the catalyst as a powdery material by precipitating hydrated silica from a solution of an alkaline silicate by the acidification thereof in the presence of an added component which promotes the precipitation of the hydrated silica in said powdery form, and purifying the hydrated silica to substantially remove alkali metal impurities, separately preparing a minor proportion of the catalyst material as a hydrogel substantially free of alkali metal impurities, commingling said hydrogel with the powdery hydrated silica, and forming the resultant mixture into shaped bodies.

2. A process for the manufacture of catalytic material suitable for use in hydrocarbon conversion reactions which comprises preparing a major proportion of the catalyst as a powdery material by precipitating hydrated silica from a solution of an alkaline silicate by the acidification thereof in the presence of an added component which promotes the precipitation of the hydrated silica in said powdery form, and purifying the hydrated silica to substantially remove alkali metal impurities, separately preparing a minor proportion of the catalyst material as a hydrogel by precipitating a silica hydrogel from a solution of an alkaline silicate by the acidification thereof, purifying the silica hydrogel while in the wet condition by the removal of alkali metal impurities, and mixing said powdery and hydrogel materials and extruding.

3. A process for the manufacture of catalytic material suitable for use in hydrocarbon conversion reactions which comprises preparing a major proportion of the catalyst as a powdery material by precipitating hydrated silica from a solution of an alkaline silicate by the acidification thereof in the presence of an added component which promotes the precipitation of the hydrated silica in said powdery form, purifying to substantially remove alkali metal impurities and compositing with a hydrous oxide precipitate selected from the group consisting of alumina, zirconia, and alumina-zirconia, separately preparing a minor proportion of the catalyst material as a hydrogel by precipitating a silica hydrogel from a solution of an alkaline silicate by the acidification thereof, purifying the silica hydrogel while in wet condition by the removal of alkali metal impurities, and compositing the purified silica hydrogel with a hydrous oxide gel selected from the group consisting of alumina, zirconia, and alumina-zirconia, mixing said powdery and hydrogel materials and extruding.

4. A process for the manufacture of catalytic material suitable for use in hydrocarbon conversion reactions which comprises preparing a major proportion of the catalyst as a powdery material by precipitating hydrated silica from a solution of an alkaline silicate by the acidification thereof in the presence of an added component which promotes the precipitation of the hydrated silica in said powdery form, purifying to substantially remove alkali metal impurities and compositing the purified finely divided hydrated silica with a hydrous oxide precipitate selected from the group consisting of alumina, zirconia, and alumina-zirconia, separately preparing a minor proportion of the catalyst material as a hydrogel by coprecipitating a hydrogel of silica and a metal oxide gel selected from the group consisting of alumina, zirconia, and alumina-zirconia, purifying said coprecipitated hydrogel while in a wet condition by the removal of alkali metal impurities, mixing said powdery and coprecipitated hydrogel materials and extruding.

5. A process for the manufacture of catalytic material suitable for use in hydrocarbon conversion reactions which comprises preparing a major proportion of the catalyst as a powdery material by precipitating hydrated silica from a solution of an alkali metal silicate by the addition thereto of hydrochloric acid in the presence of added sodium chloride in sufficient concentration and at a suitable dilution to precipitate hydrated silica in said powdery form, purifying to substantially remove alkali metal impurities, and compositing the purified finely divided hydrated silica with a hydrous oxide precipitate selected from the group consisting of alumina, zirconia, and alumina-zirconia, separately preparing a minor proportion of the catalyst material as a hydrogel by precipitating a silica hydrogel from a solution of an alkali silicate by the acidification thereof, purifying the silica hydrogel while in the wet condition by the removal of alkali metal impurities, and compositing the purified silica hydrogel with a hydrous oxide gel selected from the group consisting of alumina, zirconia, and alumina-zirconia, mixing said powdery and hydrogel materials and extruding.

6. A process for the manufacture of catalytic material suitable for use in hydrocarbon conversion reactions which comprises preparing a major proportion of the catalyst as a powdery material by precipitating hydrated silica from a solution of an alkaline silicate by the acidification thereof in the presence of an added component which promotes precipitation of the hydrated silica in said powdery form, compositing with a hydrous oxide selected from the group consisting of alumina, zirconia, and alumina-zirconia, and purifying the composited hydrated oxides to substantially remove alkali metal impurities, separately preparing a minor proportion of the catalyst material as a hydrogel by precipitating a hydrogel from a solution of an alkaline silicate by the acidification thereof, purifying the silica hydrogel while in the wet condition by the removal of alkali metal impurities, and compositing the purified silica hydrogel with a hydrous oxide gel selected from the group consisting of alumina, zirconia, and alumina-zirconia, mixing said powdery and hydrogel materials and extruding.

7. A process for the manufacture of catalytic material suitable for use in hydrocarbon conversion reactions which comprises preparing a major proportion of the catalyst as a powdery material by precipitating hydrated silica from a solution of an alkali metal silicate by the addition of hydrochloric acid and in the presence of added sodium chloride in sufficient concentration and at a suitable dilution so as to precipitate the hydrated silica in said powdery form, adding a soluble salt of zirconium to the suspension of powdery hydrated silica and precipitating hydrated zirconia in the presence of the powdery hydrated silica by the addition of an alkaline precipitant, purifying said hydrated silica-hydrated zirconia composite to substantially remove alkali metal impurities, suspending the purified powdery hydrated silica-hydrated zirconia composite in a solution of an aluminum salt and precipitating hydrated alumina in the presence of said finely divided purified precipitate in suspension by the addition of ammonium hydroxide, filtering, washing and extruding the product.

8. A process for the manufacture of catalytic material suitable for use in hydrocarbon conversion reactions which comprises preparing a major proportion of the catalyst as a powdery material by precipitating hydrated silica from a solution of an alkali metal silicate by the addition of hydrochloric acid and in the presence of added sodium chloride in sufficient concentration and at a suitable dilution so as to precipitate the hydrated silica in said powdery form, adding a soluble salt of aluminum to the suspension of powdery hydrated silica and precipitating hydrated alumina in the presence of the powdery hydrated silica by the addition of an alkaline precipitant, purifying said hydrated silica-hydrated alumina composite to substantially remove alkali metal impurities, suspending the purified finely divided hydrated silica-hydrated alumina composite in a solution of a zirconium salt and precipitating hydrated zirconia in the presence of said powdery purified precipitate in suspension by the addition of ammonium hydroxide, filtering, washing and extruding the product.

9. A process for the manufacture of catalytic material suitable for use in hydrocarbon conversion reactions which comprises preparing a major proportion of the catalyst as a powdery material by precipitating hydrated silica from a solution of an alkali metal silicate by the addition of hydrochloric acid and in the presence of added sodium chloride in sufficient concentration and at a suitable dilution so as to precipitate the hydrated silica in said powdery form, adding a soluble salt of zirconium to the suspension of powdery hydrated silica and precipitating hydrated zirconia in the presence of the powdery hydrated silica, purifying said hydrated silica-hydrated zirconia composite to substantially remove alkali metal impurities, mixing the purified powdery hydrated silica-hydrated zirconia composite with a separately prepared alkali-metal free alumina hydrogel and extruding the product.

10. A process for the manufacture of catalytic material for use in hydrocarbon conversion reactions which comprises preparing a major proportion of the catalyst as a powdery material by precipitating hydrated silica from a solution of an alkali metal silicate by the addition of hydrochloric acid and in the presence of added sodium chloride in sufficient concentration and at a suitable dilution so as to precipitate the hydrated silica in said powdery form, adding a soluble salt of aluminum to the suspension of powdery hydrated silica and precipitating hydrated alumina in the presence of the powdery hydrated silica, purifying said hydrated silica-hydrated alumina composite to substantially remove alkali metal impurities, mixing the purified powdery hydrated silica-hydrated alumina composite with a separately precipitated alkali metal free zirconia hydrogel and extruding the product.

LOUIS S. KASSEL.